United States Patent
Horihata et al.

(10) Patent No.: US 9,897,455 B2
(45) Date of Patent: Feb. 20, 2018

(54) TRAVEL ROUTE INFORMATION GENERATION APPARATUS

(71) Applicant: DENSO CORPORATION, Kariya, Aichi-pref. (JP)

(72) Inventors: Satoshi Horihata, Kariya (JP); Takamitsu Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 179 days.

(21) Appl. No.: 14/893,454

(22) PCT Filed: May 26, 2014

(86) PCT No.: PCT/JP2014/002752
§ 371 (c)(1),
(2) Date: Nov. 23, 2015

(87) PCT Pub. No.: WO2014/192276
PCT Pub. Date: Dec. 4, 2014

(65) Prior Publication Data
US 2016/0091324 A1  Mar. 31, 2016

(30) Foreign Application Priority Data
May 31, 2013 (JP) .................. 2013-115750

(51) Int. Cl.
*G01C 21/32* (2006.01)
*G08G 1/01* (2006.01)
*G08G 1/0968* (2006.01)

(52) U.S. Cl.
CPC ........... *G01C 21/32* (2013.01); *G08G 1/0112* (2013.01); *G08G 1/0133* (2013.01); *G08G 1/0141* (2013.01); *G08G 1/096811* (2013.01)

(58) Field of Classification Search
CPC .... G01C 21/32; G08G 1/0112; G08G 1/0133; G08G 1/0141; G08G 1/096811
See application file for complete search history.

(56) References Cited

U.S. PATENT DOCUMENTS

2003/0018428 A1* 1/2003 Knockeart ......... G01C 21/3415
                                                342/357.31
2008/0162041 A1   7/2008 Nakamura
(Continued)

FOREIGN PATENT DOCUMENTS

JP   2005172578 A   6/2005
JP   2006220499 A   8/2006
(Continued)

OTHER PUBLICATIONS

International Search Report and Written Opinion (in Japanese with English Translation) for PCT/JP2014/002752, dated Sep. 2, 2014; ISA/JP.

*Primary Examiner* — Richard Camby
(74) *Attorney, Agent, or Firm* — Harness, Dickey & Pierce, P.L.C.

(57) ABSTRACT

A server acquires location information data and direction information data. The location information data indicates a travel path of vehicles with discrete locations. The direction information data indicates a traveling direction at each location indicated by the location information data. The server generates information about a new travel route that does not exist in the map data, based on off-route location information data indicative of a travel path deviated from travel routes existing in map data. The server estimates partial travel routes indicative of parts of the new travel route, based on the off-route location information data and the direction information data indicative of associated traveling directions of vehicles. The server then estimates the (Continued)

shape of the new travel route, based on the estimated partial travel routes.

7 Claims, 8 Drawing Sheets

(56) References Cited

U.S. PATENT DOCUMENTS

| | | |
|---|---|---|
| 2008/0189034 A1 | 8/2008 | Sugiura |
| 2011/0172913 A1 | 7/2011 | Nakamura et al. |
| 2011/0238294 A1 | 9/2011 | Shikimachi et al. |
| 2014/0343838 A1* | 11/2014 | Ahn .................. G08G 1/096827 701/423 |

FOREIGN PATENT DOCUMENTS

| | | |
|---|---|---|
| JP | 2008164826 A | 7/2008 |
| JP | 2008191055 A | 8/2008 |
| JP | 2010261783 A | 11/2010 |
| JP | 2011145159 A | 7/2011 |
| JP | 2011154404 A | 8/2011 |
| JP | 2011196915 A | 10/2011 |
| WO | WO-2012104966 A1 | 8/2012 |

* cited by examiner

TRAVEL ROUTE INFORMATION GENERATION APPARATUS

CROSS REFERENCE TO RELATED APPLICATIONS

This application is a U.S. National Phase Application under 35 U.S.C. 371 of International Application No. PCT/JP2014/002752 filed on May 26, 2014 and published in Japanese as WO 2014/192276 A1 on Dec. 4, 2014. This application is based on and claims the benefit of priority from Japanese Patent Application No. 2013-115750 filed on May 31, 2013. The entire disclosures of all of the above applications are incorporated herein by reference.

TECHNICAL FIELD

The present disclosure relates to a technology for generating information about a travel route that does not exist in a map represented by map data.

BACKGROUND ART

There is known a technology that updates map data according to information indicative of a path traveled by vehicles when the vehicles traveled on a newly open route or other route that is not found in a map represented by existing map data (refer to Patent Literature 1).

PRIOR ART LITERATURES

Patent Literature

Patent Literature 1: JP 2011-145159 A

SUMMARY OF INVENTION

The above technology uses discrete locations to indicate a travel path. In other words, the technology enables the vehicle to periodically detect a current location and estimate a travel path (the shape of a travel route) according to location information data indicative of detected locations. The amount of data increases with a decrease in current location detection intervals. The increase in the amount of data causes an increase, for example, in processing load and communication load; this demands the detection intervals to be set to be appropriately long. If the amount of location information data indicative of a travel path were small, the shape of an estimated travel route might deviate from the shape of an actual travel route.

It is an object of the present disclosure to provide a technology that reduces the deviation between the shape of an estimated travel route and the shape of an actual travel route even when the amount of location information data indicative of a path traveled by vehicles is small.

According to an example of the present disclosure, a travel route information generation apparatus is provided to include an acquisition section and a generation section. The acquisition section acquires location information data and direction information data, the location information data indicating a travel path of a vehicle using discrete locations, the direction information data indicating a travel direction of the vehicle at each location indicated by the location information data. The generation section generates information on a new travel route that does not exist in a map represented by map data, based on off-route location information data, the off-route location information data being the location information data indicative of a travel path deviated from a travel route existing in the map represented by the map data. The generation section includes an estimation section that estimates partial travel routes indicative of parts of the new travel route based on the off-route location information data and the direction information data indicative of the traveling direction at each location indicated by the off-route location information data, and estimates a shape of the new travel route based on the partial travel routes.

Even when the amount of location information data indicative of a path traveled by vehicles is small, the above-described configuration can reduce the deviation between the shape of an estimated travel route and the shape of an actual travel route as compared to a case where the shape of a new travel route is estimated based on the location information data alone.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

An embodiment of the present disclosure will now be described with reference to the accompanying drawings.

[1. Configuration]

Figure 1:
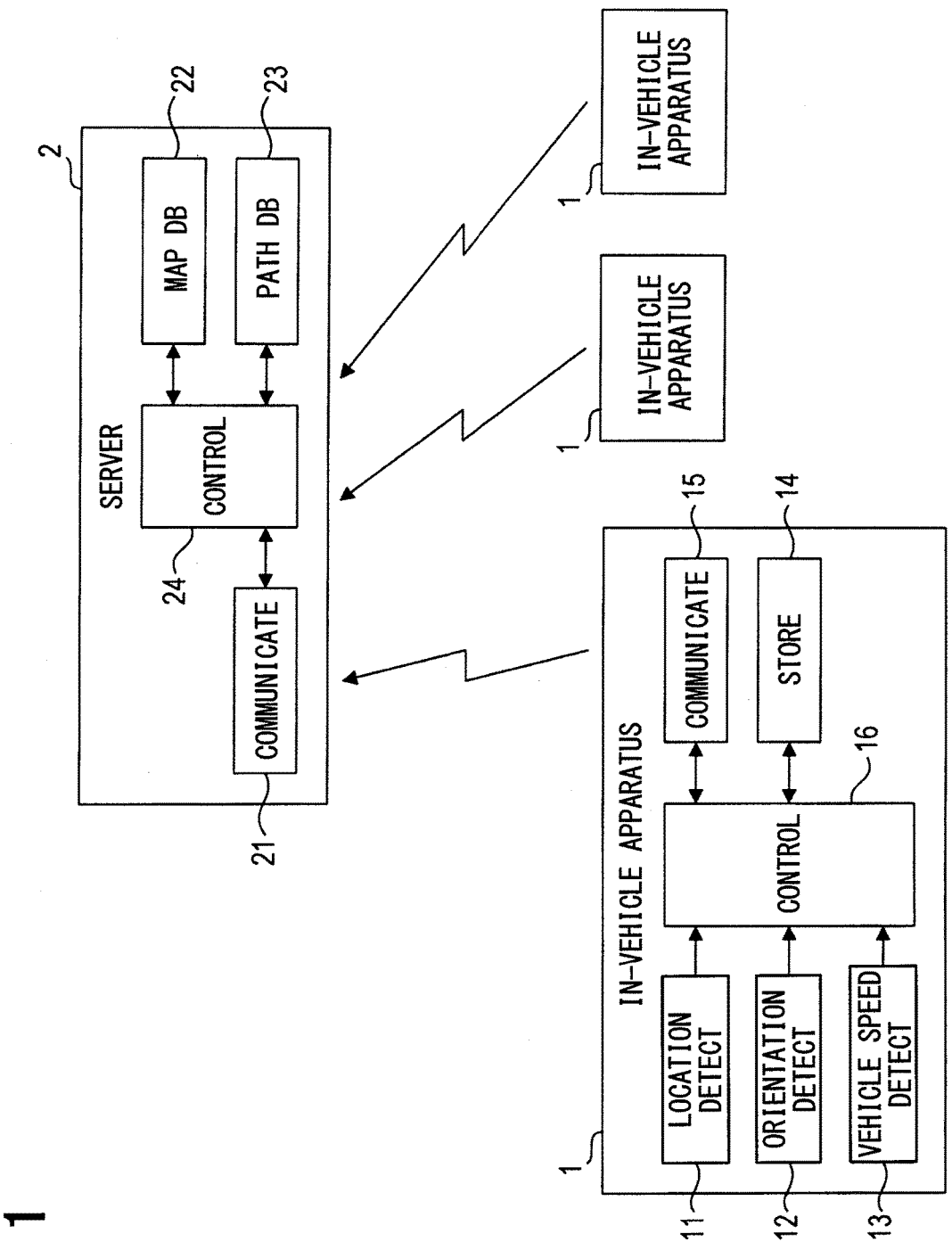
FIG. 1 is a block diagram illustrating a configuration of a travel route information collection system.

A travel route information collection system shown in FIG. 1 includes an in-vehicle apparatus 1 and a server 2. The in-vehicle apparatus 1 is mounted in each of a plurality of vehicles. The server 2 is capable of wirelessly communicating with the in-vehicle apparatus 1 through a communication network (for example, a mobile communication network or the Internet).

The in-vehicle apparatus 1 includes a location detection portion 11, an orientation detection portion 12, a vehicle speed detection portion 13, a storage portion 14, a communication portion 15, and a control circuit 16. The same in-vehicle apparatus 1 is mounted in each of the plurality of vehicles.

The location detection portion 11 measures the absolute location of a host vehicle (a vehicle in which the in-vehicle apparatus 1 is mounted). The present embodiment measures the latitude, longitude, and altitude of the host vehicle by using a global positioning system (GPS) receiver that receives signals transmitted from GPS satellites. As is well known, the GPS receiver is capable of acquiring highly accurate time information data.

The orientation detection portion 12 measures the traveling direction (absolute orientation) of the host vehicle. The present embodiment uses a gyroscope that outputs a detection signal based on the angular velocity of rotational motion applied to a vehicle. For example, a geomagnetic sensor that detects the absolute orientation of the host vehicle according to geomagnetism may be used in place of the gyroscope or in addition to the gyroscope.

The vehicle speed detection portion 13 measures the traveling speed of the host vehicle.

The storage portion 14 stores various data. The present embodiment uses a flash memory that serves as a nonvolatile storage apparatus capable of electrically rewriting stored data.

The communication portion 15 wirelessly communicates with the server 2 by using radio waves.

The control circuit 16 includes a computer to perform various processes according to programs.

More specifically, the control circuit 16 uses the location detection portion 11, the orientation detection portion 12, and the vehicle speed detection portion 13 to measure information or information data indicative of a travel path of the host vehicle on a periodic basis (at 5-second intervals or other predetermined time intervals in the present embodiment). That is, the control circuit 16 acquires location information data indicative of an absolute location (latitude, longitude, and altitude), direction information data indicative of a traveling direction, and speed information data indicative of a traveling speed at periodic measurement time intervals, and causes the storage portion 14 to store the above-mentioned information data in association with measurement time. The location information data indicates the host vehicle's travel path with discrete locations (location measurement points). The direction information data indicates the host vehicle's traveling direction at a location measurement point. The speed information data indicates the host vehicle's traveling speed at a location measurement point.

Further, the control circuit 16 transmits the location information data, direction information data, and speed information data, which are acquired at measurement time intervals, stored in the storage portion 14, and handled as travel path data, to the server 2 through the communication portion 15 at a predetermined point of time together with identification information data about the host vehicle. In the present embodiment, the control circuit 16 transmits untransmitted travel path data to the server 2 at a time when an engine of the host vehicle starts up. The time of transmitting the travel path data is not specifically limited. For example, the travel path data may be transmitted on a periodic basis (at predetermined time intervals or at predetermined traveled distance intervals) or at a time when a transmission procedure is performed by a driver of the host vehicle.

Meanwhile, the server 2 includes a communication portion 21, a map database 22, a path database 23, and a control circuit 24. The communication portion 21 wirelessly communicates with the in-vehicle apparatus 1 by using radio waves.

The map database 22 is a storage apparatus that stores map data. The map data represents a map that shows travel routes on which a vehicle can travel. The travel routes include roads (for example, expressways and local roads) used for route guidance by a vehicle's navigation system, as well as parking lots and roads (for example, community roads) not used for route guidance.

The path database 23 is a storage apparatus that stores travel path data received from the in-vehicle apparatuses 1.

The control circuit 24 includes a computer to perform various processes according to programs. The control circuit 24 may be formed of hardware such as one IC or a plurality of ICs.

In the present embodiment, the travel path data is transmitted to the server 2 at a time dependent on each in-vehicle apparatus 1. The control circuit 24 thus performs a process to be able to receive the travel path data at all times, and causes the path database 23 to store the received travel path data.

Further, the control circuit 24 performs a later-described travel route information generation process to generate information about a new travel route, which does not exist in a map represented by the map data. The control circuit 24 then distributes the generated information to the in-vehicle apparatuses 1 by wireless communication. The information distributed from the server 2 can be used in a navigation system of each in-vehicle apparatus 1.

[2. Processing]

Figure 2:
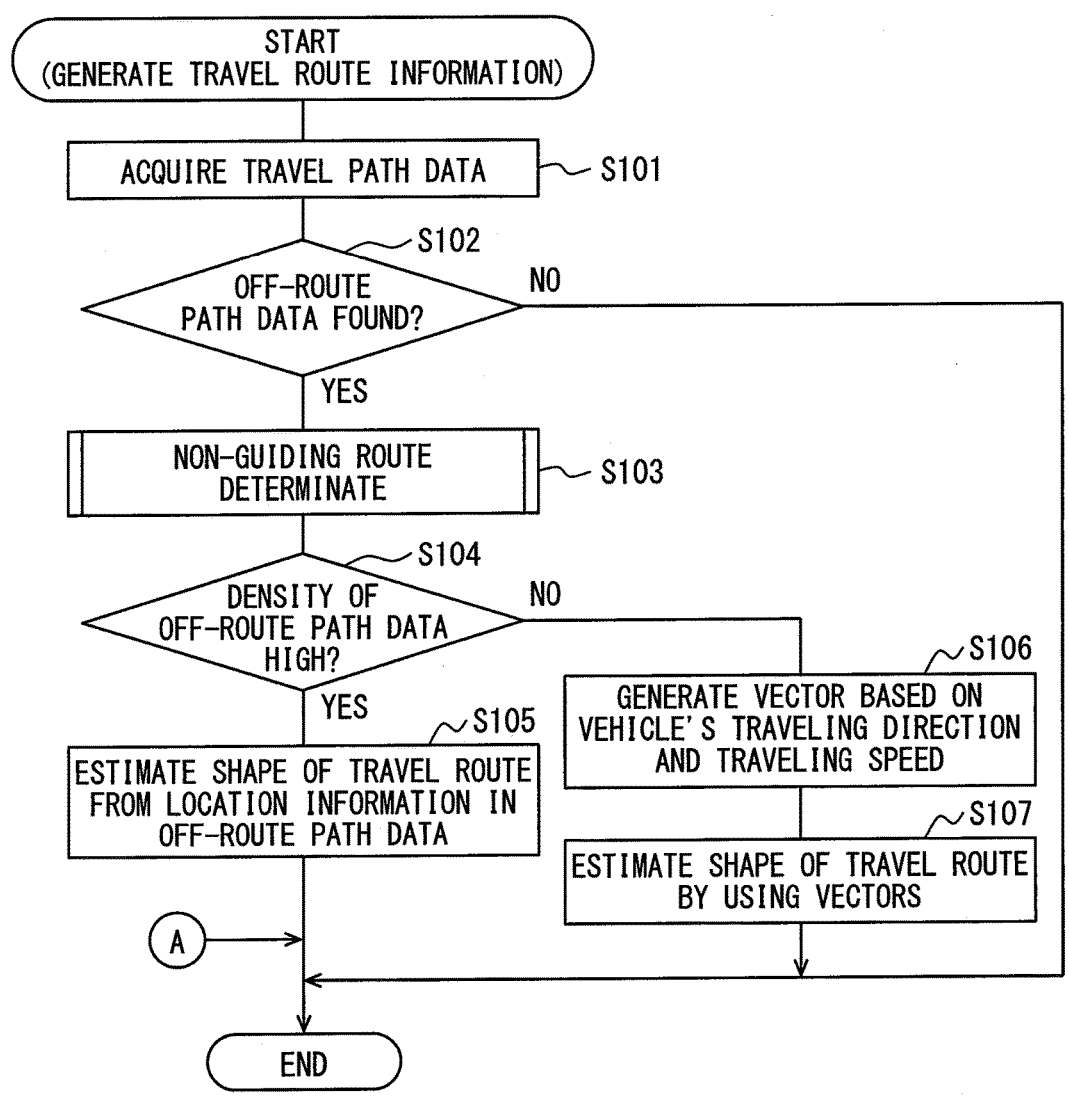
FIG. 2 is a flowchart illustrating a travel route information generation process.

The travel route information generation process, which is performed by the control circuit 24 to generate the information about a new travel route, will now be described with reference to the flowchart of FIG. 2. The travel route information generation process in FIG. 2 is performed on a periodic basis (for example, once each day).

It is noted that a flowchart or the processing of the flowchart in the present application includes sections (also referred to as steps), each of which is represented, for instance, as S101. Further, each section can be divided into several sub-sections while several sections can be combined into a single section. Furthermore, each of thus configured sections can be also referred to as a device, module, or means. Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

First, the control circuit 24 acquires travel path data (S101). More specifically, the travel path data (daily travel path data in the present embodiment) newly received after the last travel route information generation process (performed one cycle earlier) is read from the path database 23 as processing target travel path data, which is to be processed.

Next, the control circuit 24 determines whether the processing target travel path data includes off-route path data (S102). The off-route path data is travel path data having location information data indicative of a travel path deviating from an existing travel route, which is a travel route existing in a map represented by the map data. The present embodiment uses a well-known map matching technology to determine whether a plurality of successive location measurement points of the same vehicle (locations indicated by the location information data) are on an existing travel route, and handles travel path data at location measurement points deviated from an existing travel route as the off-route path data. The successive location measurement points of the same vehicle are location measurement points that are related to identical vehicle identification information data and successive points of measurement time.

Figure 6:
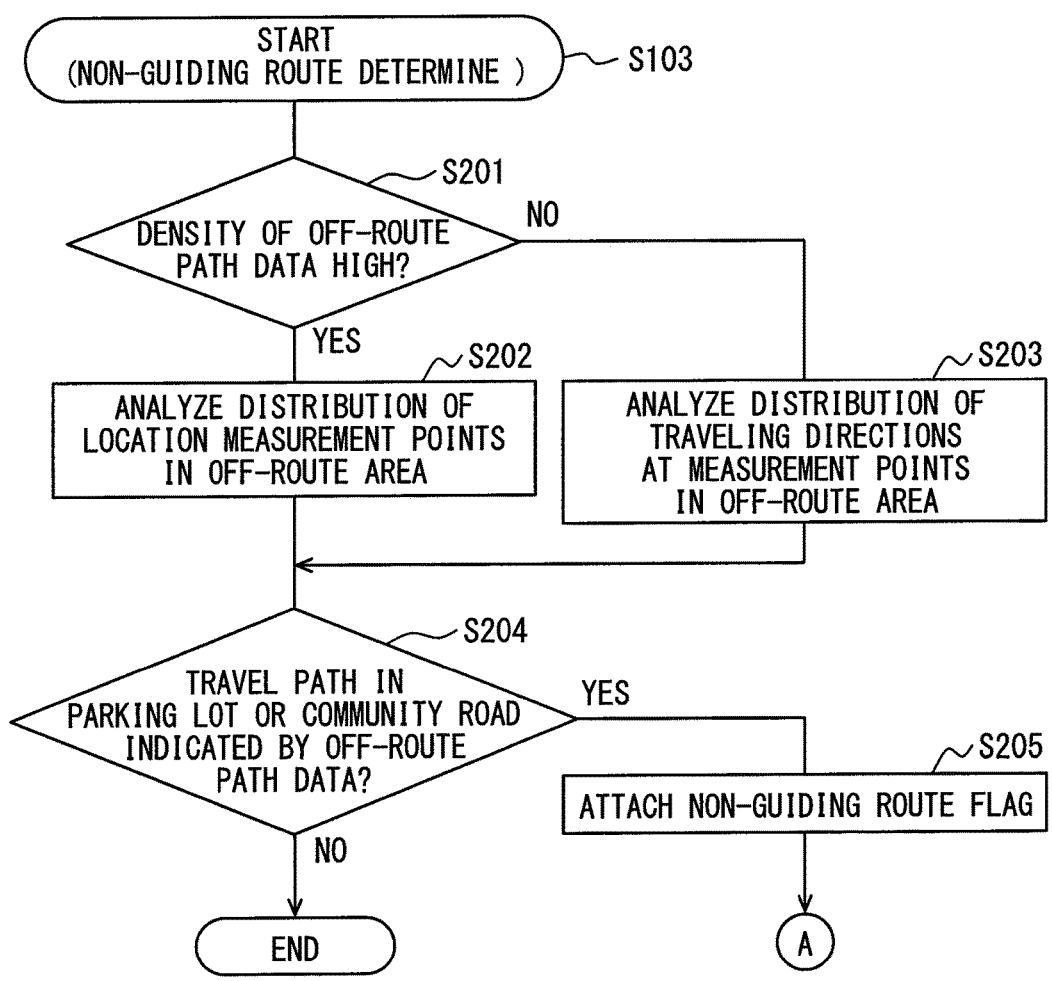
FIG. 6 is a flowchart illustrating a non-guiding route determination process.

If it is determined that the processing target travel path data does not include off-route path data (S102: NO), the control circuit 24 terminate the travel route information generation process in FIG. 2. If, by contrast, it is determined that the processing target travel path data includes off-route path data (S102: YES), the control circuit 24 performs a non-guiding route determination process (S103). The non-guiding route determination process will be described in detail later (FIG. 6). The non-guiding route determination process determines whether off-route location information data, which is location information data included in the off-route path data, represents a travel path on a travel route irrelevant to route guidance by a vehicle's navigation system. In the present embodiment, the travel route irrelevant to route guidance is a parking lot or a community road (a travel route in a residential area).

Figure 3:
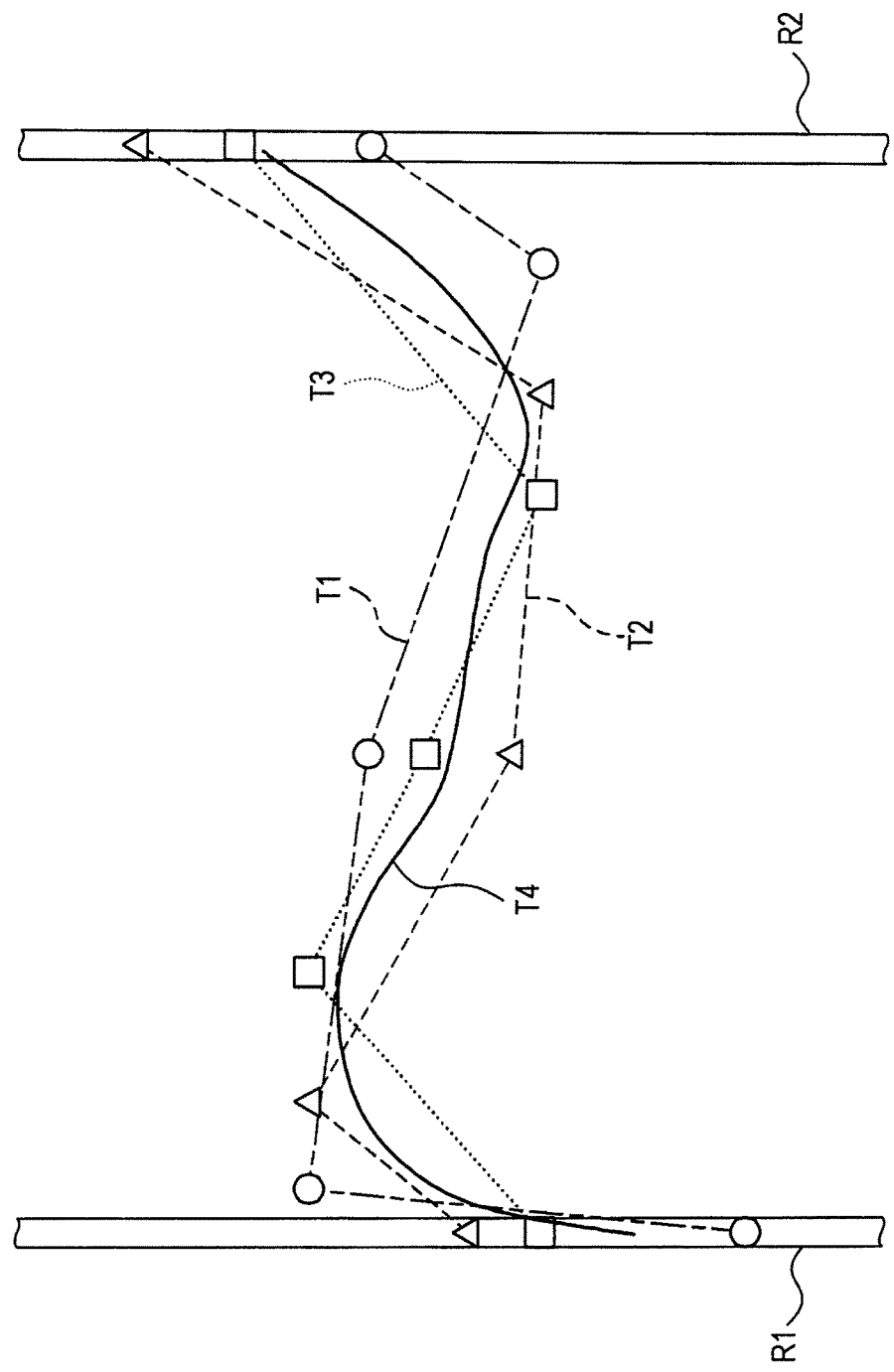
FIG. 3 is a diagram illustrating a simple method of generating a travel path.

Next, the control circuit 24 determines whether the density of the off-route path data (the density of location measurement points indicated by the off-route location information data) is high (S104). FIG. 3 uses circular, triangular, and rectangular marks to indicate location measurement points of a plurality of vehicles (three vehicles in this example) between two existing travel routes R1, R2. The control circuit 24 generates simple travel paths T1, T2, T3 (shaped like a polygonal line) of the vehicles by sequentially joining, with line segments, successive location measurement points of each vehicle, which are indicated by the off-route path data. The control circuit 24 then generates an average travel path (a travel path indicative of a new travel route) T4 on the basis of the generated travel paths T1, T2, T3, and calculates the length of the travel path T4 (distance) between the point of leaving the existing travel route R1 and the point of entering the existing travel route R2. Subsequently, if the number (average number) of location measurement points per unit length (for example, 100 m) is not smaller than a predetermined threshold value, the control circuit 24 determines that the density of the off-route path data is high. If, by contrast, the number of location measurement points per unit length is smaller than the predetermined threshold value, the control circuit 24 determines that the density is not high (is low).

The threshold value may be changed based on the vehicle's traveling speed (the threshold value applied during a high-speed travel may be different from the threshold value applied during a low-speed travel). More specifically, the threshold value may decrease with an increase in the average value of traveling speeds at all location measurement points used to determine the aforementioned average travel path T4. The reason is that when an employed configuration measures a vehicle's location at predetermined time intervals, the density of the location measurement points decreases with an increase in the traveling speed. The above-described method of determining the density of location measurement points is merely an example. A different method may alternatively be used.

If it is determined that the density of the off-route path data is high (S104: YES), the control circuit 24 estimates the shape of the new travel route from the location measurement points indicated by the off-route location information data included in the off-route path data (S105), and then terminates the travel route information generation process shown in FIG. 2.

Figure 4A:
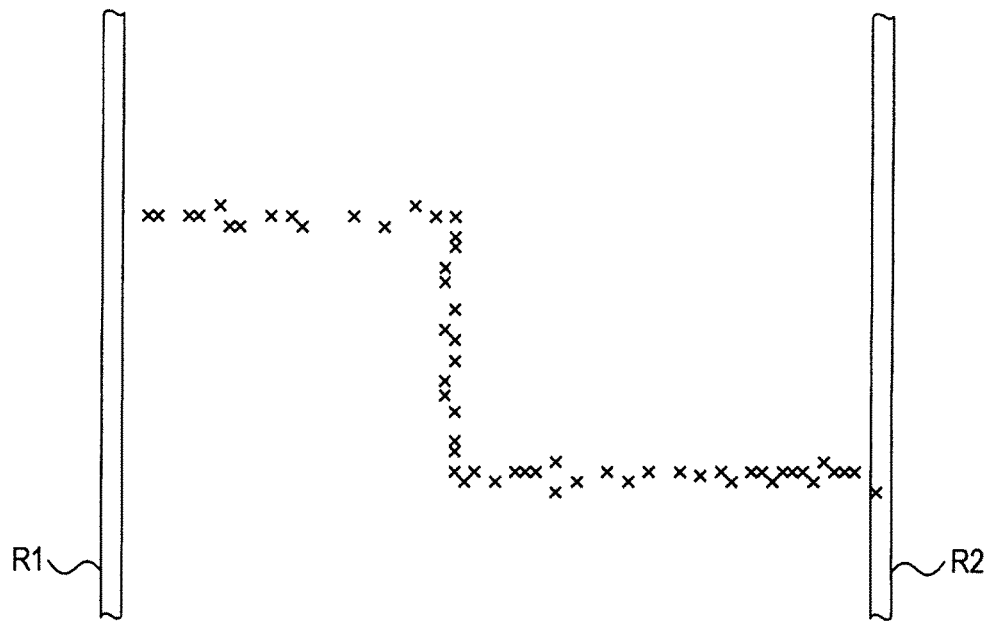
FIG. 4A is a diagram illustrating highly-dense location measurement points.
Figure 4B:
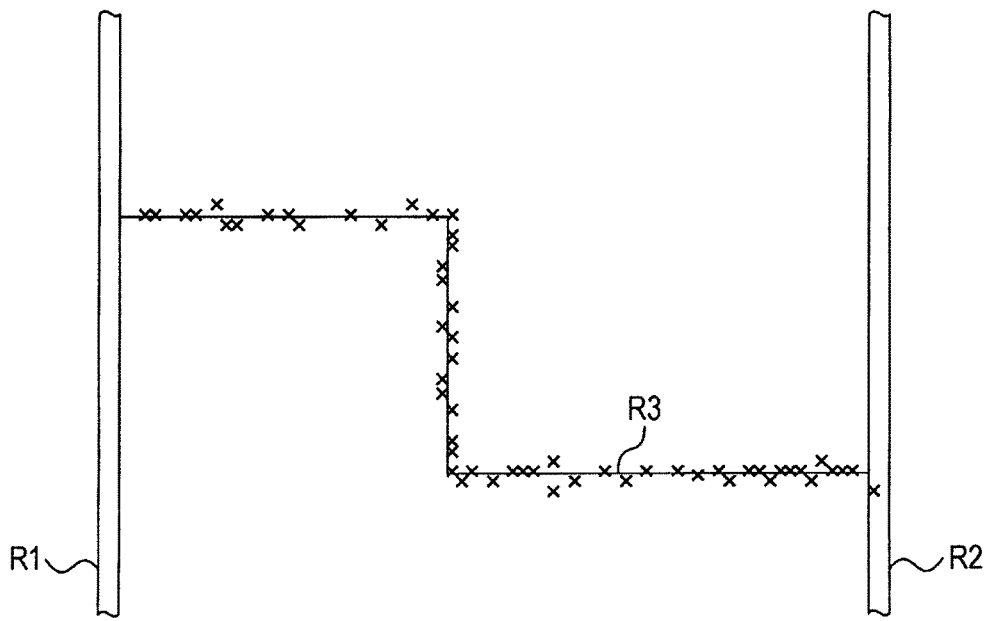
FIG. 4B is a diagram illustrating a new travel route that is estimated from highly-dense location measurement points.

If the density of the location measurement points is high as shown in FIG. 4A, the overall shape of the new travel route R3 can be estimated from the location measurement points as indicated in FIG. 4B. In other words, the shape of the new travel path is estimated in S105 by performing a well-known process (for example, linear approximation or curve approximation) of calculating a line indicative of the new travel route from a set of the location measurement points. In addition to latitude and longitude, altitude is also taken into consideration to avoid inadvertent mixture of location information data on different hierarchical levels (altitudes), such as local roads and expressways positioned above the local roads. More specifically, the shape of a travel route is estimated for each set of location information data on similar altitudes (which are determined to be on the same plane). Further, the direction information data may be used to determine whether the new travel route is a one-way street or a two-way street.

If, by contrast, it is determined that the density of the off-route path data is not high (is low) (S104: NO), the control circuit 24 performs processing as indicated in S106 and S107, and then terminates the travel route information generation process shown in FIG. 2. In S106 and S107, the control circuit 24 estimates the shape of the new travel route in consideration of the direction information data and speed information data as well as the off-route location information data in the off-route path data.

Figure 5A:
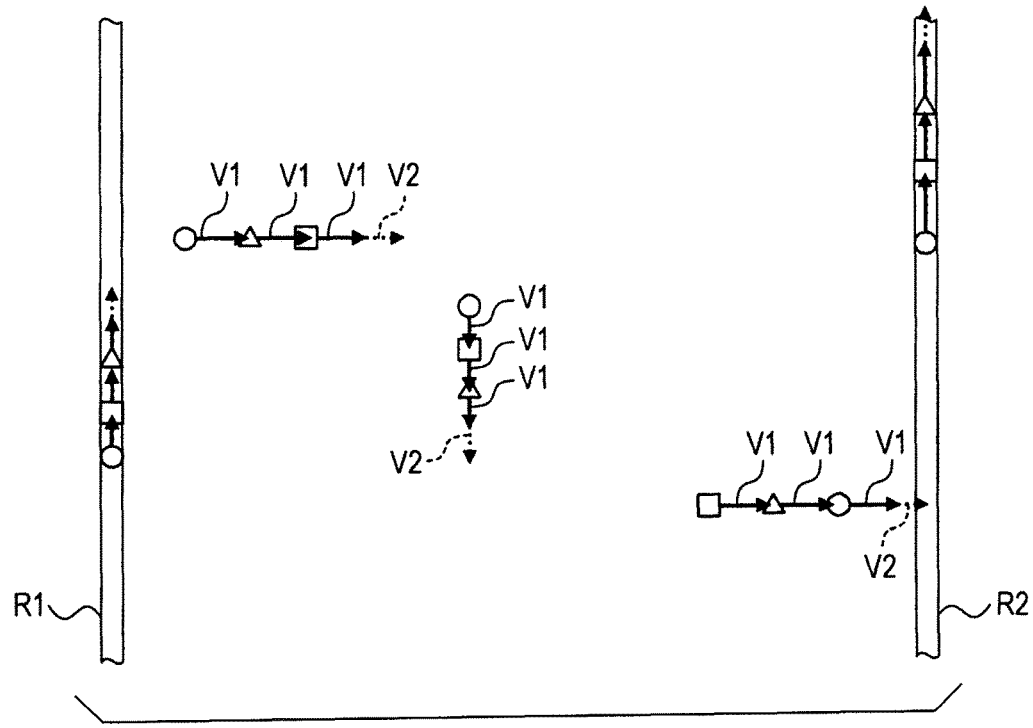
FIG. 5A is a diagram illustrating a vector that is generated for each location measurement point.

More specifically, as in FIG. 5A, the control circuit 24 generates, for each location measurement point, a vector V1 having the same direction as the vehicle's traveling direction at a location measurement point and a magnitude appropriate for the vehicle's traveling speed (for example, a magnitude proportional to the traveling speed) (S106). If the vehicle's traveling direction at a location measurement point is eastward, it is estimated that a travel route measured at the location measurement point will continue eastward from the location measurement point. The estimated distance over which the travel route will continue eastward increases with an increase in the traveling speed at the location measurement point. The reason is that when the vehicle significantly changes its traveling direction (for example, turns left or right), the vehicle needs to reduce its traveling speed and therefore does not significantly change its traveling direction while its traveling speed is reduced. Thus, the vector V1 generated here is set so as to include points that are highly likely to be passed by the vehicle when the vehicle travels straight at a certain traveling speed in a certain traveling direction from a certain location measurement point. In other words, the vector V1 corresponds to a part of the new travel route estimated from location measurement points. Further, when the end point of the vector V1 is handled as a virtual location measurement point, it can be considered that the apparent number of location measurement points is increased.

Next, the control circuit 24 joins the vectors V1 generated for a plurality of location measurement points that exist close to each other and are similar in the traveling direction, interpolates the joined vectors V1, and estimates the shape of the new travel route (S107). More specifically, the positional condition of location measurement points A and B existing close to each other is defined as being satisfied when location measurement point B exists within a radius of R from location measurement point A. When location measurement points A and B, which meet the positional conditions, are similar to each other in the traveling direction (the direction of the vector V1) (when, for example, location measurement points A and B are within a predetermined angle with respect to the average value), the control circuit 24 joins the vectors V1 at location measurement points A and B to generate a joined vector V2. Although the description given here relates to two location measurement points (location measurement points A and B), the same holds true for three or more location measurement points.

The start point of the joined vector V2 is set at one of a plurality of joined location measurement points (at a location measurement point positioned at the end of traveling direction in the present embodiment, that is, a location measurement point having the smallest coordinate value on a coordinate axis extended in a direction providing the average direction of the vectors V1 at the location measurement points). Further, the direction of the joined vector V2 is set as appropriate for the directions of the vectors V1 at the location measurement points to be joined (set to the average value in the present embodiment). In other words, the directions of a plurality of vectors V1 are equalized. The magnitude of the joined vector V2 is set as appropriate for the magnitudes of the location measurement points to be joined (set to the total value in the present embodiment).

Figure 5B:
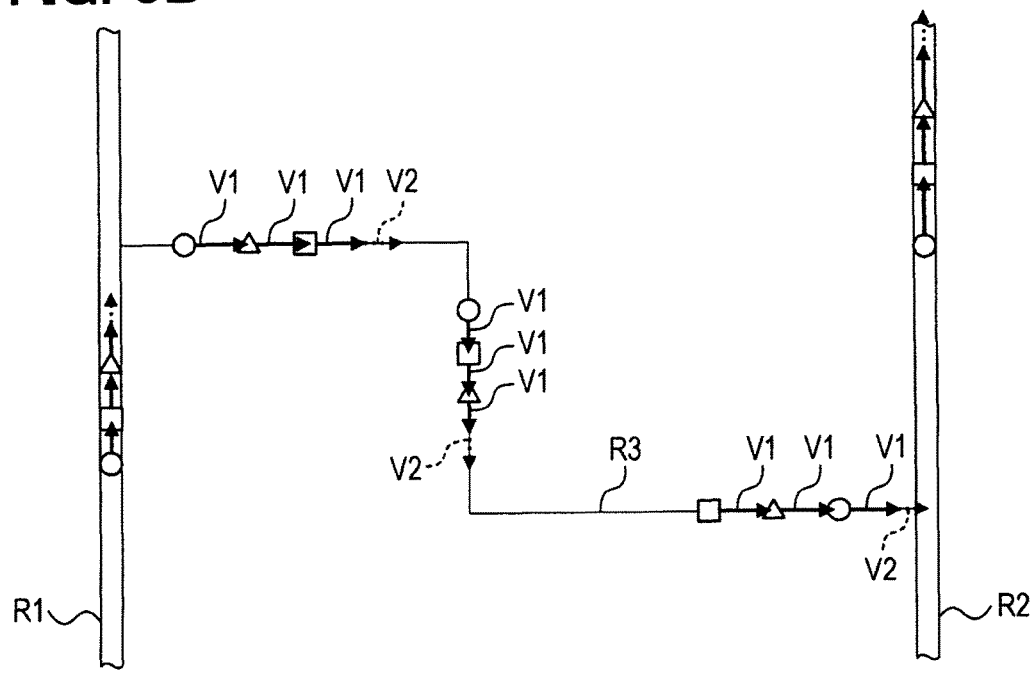
FIG. 5B is a diagram illustrating a new travel route that is estimated from the vector for each location measurement point.

After generating the joined vector V2, the control circuit 24 estimates a line segment between the start and end points of the joined vector V2 as a part of the new travel route (a partial travel route). In other words, the control circuit 24 estimates a partial travel route that extends in the traveling direction from a location measurement point by a length appropriate for the traveling speed. Then, as in FIG. 5B, the control circuit 24 linearly extends the partial travel route to the extension line of another partial travel route in order to interpolate the insufficiency between the partial travel routes and estimate the overall shape of the new travel route R3. The shape of the new travel route may be more accurately estimated by excluding location measurement points whose traveling direction is obviously deviated. If the new travel route is a two-way street, a new travel route having the same shape can be estimated from oppositely oriented vectors. Therefore, such opposing sets of vectors may be grouped and integrated into a single travel route.

Each vector V1 (a line segment between a location measurement point and the end point of the vector V1) may be regarded as a partial travel route and subjected to the same processing without performing a process of joining the vectors V1. In such an instance, too, the directions of the vectors V1 of a plurality of location measurement points that meet the positional conditions of being positioned close to each other are equalized as far as they are similar to each other, as is the case where the joined vector V2 is generated. The equalized direction is the average direction of the vectors V1, as is the case with the joined vector V2. As the traveling directions (the directions of the vectors V1) are equalized as described above, the estimation of the shape of the new travel route remains unaffected by variations attributable, for instance, to a traveling direction detection error and a traveling direction shift during a lane change.

The non-guiding route determination process, which is performed in S103 of the travel route information generation process (FIG. 2), will now be described with reference to the flowchart of FIG. 6.

First, the control circuit 24 determines whether the density of the off-route path data (the density of location measurement points indicated by the off-route location information data) is high (S201). More specifically, as in FIG. 7A, the control circuit 24 sets an off-route area Ar, which includes the off-route path data (location measurement points indicated by the off-route location information data) and excludes existing travel routes (the existing travel routes R1, R2 in the present example). For example, the off-route area Ar may be set by setting a polygon area (for example, a circular area having a predetermined radius) centered with respect to a location measurement point for each location measurement point such that the ratio of the included polygon area is not lower than a predetermined value (for example, 90%). This setup method is used on the presumption that the density of the location measurement points is high to some extent. However, the density depends on the size of the polygon area. Therefore, a case where the density mentioned in S201 is not high is also included.

If the number of location measurement points per unit area that are included in the set off-route area Ar (average value) is not smaller than a predetermined threshold value, the control circuit 24 determines that the density of the off-route path data is high. If, by contrast, the number is smaller than the predetermined threshold value, the control circuit 24 determines that the density is not high (is low). The above-mentioned threshold value may also be changed based on the vehicle's traveling speed, as is the case with the earlier-described process in S104.

Figure 7A:
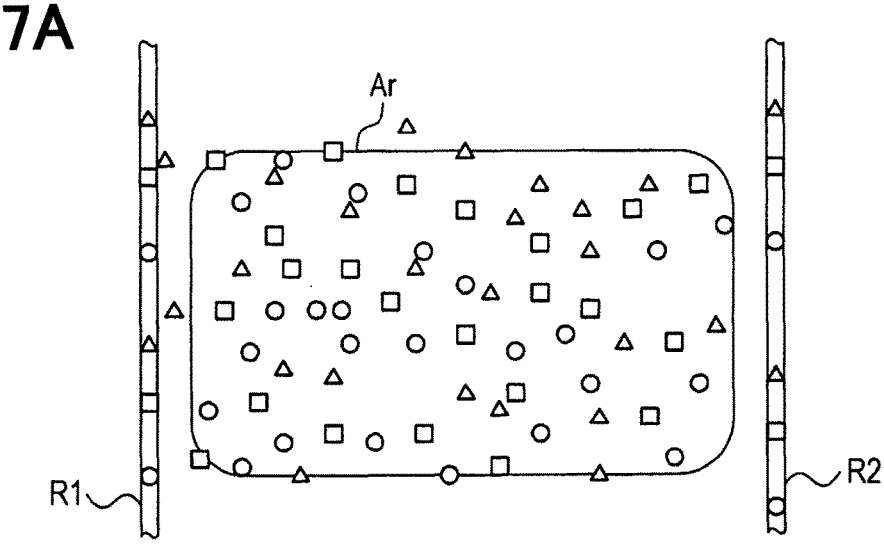
FIG. 7A is a diagram illustrating an off-route area where the density of off-route path data is high.

If it is determined that the density of the off-route path data is high (S201: YES), the control circuit 24 analyzes the distribution of location measurement points in the off-route area Ar (S202). Upon completion of S202, processing proceeds to S204. In the present embodiment, the control circuit 24 analyzes whether the location measurement points are uniformly varied in the off-route area Ar. Whether the location measurement points are uniformly varied can be determined, for example, by zoning the off-route area Ar into a plurality of vertically and horizontally arranged partial areas and determining the variance of the number of location measurement points in each partial area derived from zoning. In highways and other major roads, the location measurement points tend to be linearly concentrative. In parking lots and community roads, however, the location measurement points tend to vary (FIG. 7A). Therefore, when the degree of variation of the number of location measurement points is higher than a threshold value, the associated roads are likely to be parking lots or community roads.

Figure 7B:
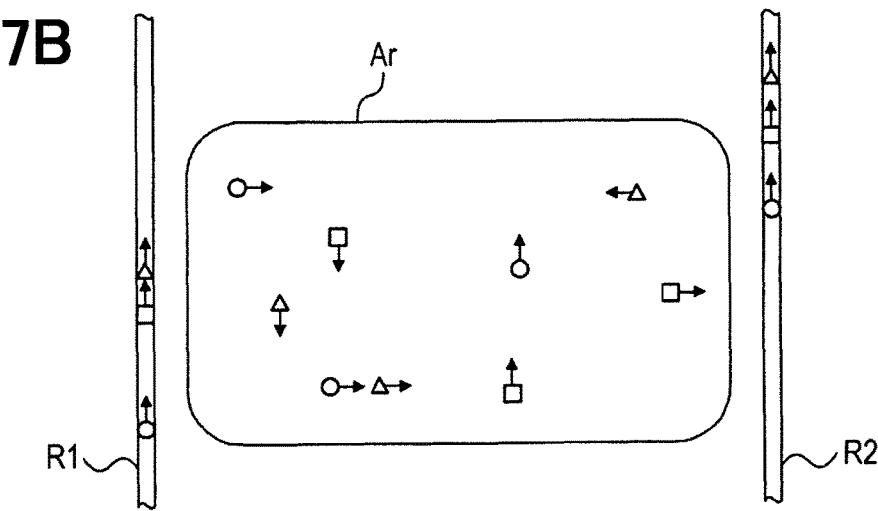
FIG. 7B is a diagram illustrating an off-route area indicative of a parking lot.
Figure 7C:
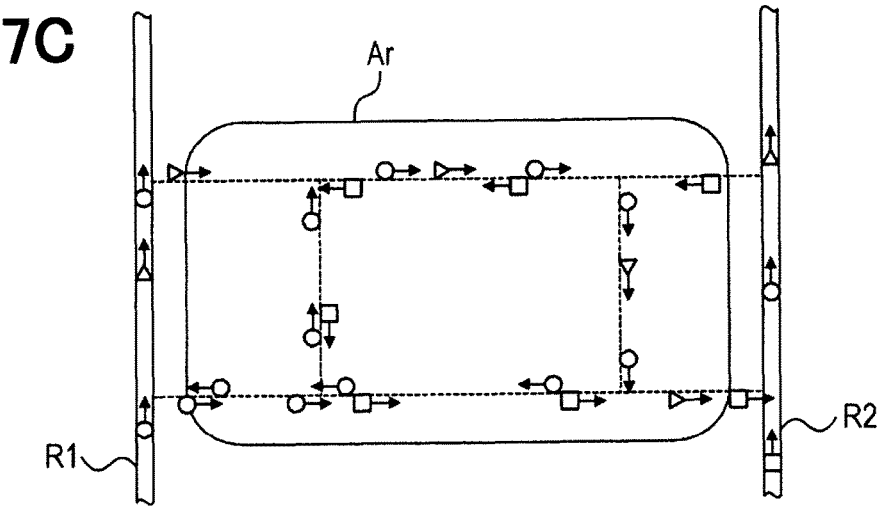
FIG. 7C is a diagram illustrating an off-route area indicative of a community road.

If, by contrast, it is determined that the density of the off-route path data is not high (is low) (S201: NO), the control circuit 24 analyzes the distribution of the traveling directions of individual location measurement points in the off-route area Ar (S203). Upon completion of S203, processing proceeds to S204. In the present embodiment, the control circuit 24 analyzes whether the traveling directions of the individual location measurement points are uniformly varied in the off-route area Ar. Whether the traveling directions are uniformly varied can be determined, for example, by classifying the traveling directions into a plurality of directions (for example, eastward, westward, southward, and northward) and determining the variance of the number of location measurement points in each classified traveling direction. In highways and other major roads, the traveling directions tend to be linearly concentrative. In parking lots, however, the traveling directions tend to vary (FIG. 7B). In community roads, the traveling directions also tend to vary because travel routes are complicated (FIG. 7C). Therefore, when the degree of variation is higher than a threshold value, the associated roads are likely to be parking lots or community roads.

In S204, the control circuit 24 determines whether the off-route path data (off-route location information data) in the off-route area Ar indicates a travel path in a parking lot or in a community road. More specifically, if the location measurement point or traveling direction analyzed in S202 or S203 is not smaller than the threshold value, the control circuit 24 determines that the off-route path data in the off-route area Ar indicates a travel path in a parking lot or in a community road.

If it is determined that the off-route path data in the off-route area Ar indicates a travel path in a parking lot or in a community road (S204: YES), a non-guiding route flag is attached to the off-route path data in the off-route area Ar (S205). As the non-guiding route flag is attached to particular path data as described above, a process can be performed in a manner different from that for path data indicative of a normal road, for example, by determining whether or not to add the particular path data to the map data or by using the particular path data for displaying a map but not for providing route guidance. Subsequently, the control circuit 24 terminates the non-guiding route determination process shown in FIG. 6, and then terminates the travel route information generation process shown in FIG. 2.

If, by contrast, it is determined that the off-route path data in the off-route area Ar does not indicate a travel path in a parking lot or in a community road (S204: NO), the control circuit 24 terminates the non-guiding route determination process shown in FIG. 6 without performing the process in S205 (returns to the travel route information generation process).

[3. Advantages]

The embodiment described in detail above provides the following advantages.

[3A] The server 2 acquires the location information data, which indicates the vehicle's travel path with discrete locations, and the direction information data, which indicates the vehicle's traveling direction at each location indicated by the location information data (S101). The server 2 then generates information about a new travel route, which does not exist in a map represented by the map data, on the basis of the off-route location information data indicative of a travel path deviating from a travel route existing in the map represented by the map data (S103 to S107). More specifically, the server 2 estimates a partial travel route indicative of each part of the new travel route on the basis of the off-route location information data and the direction information data indicative of the vehicle's traveling direction at each location indicated by the off-route location information data (S106). Next, the server 2 estimates the shape of the new travel route on the basis of the estimated partial travel routes (S107).

Consequently, even when the amount of location information data indicative of the vehicle's travel path is small, the present embodiment can reduce the deviation between the shape of an estimated travel route and the shape of an actual travel route as compared to a case where the shape of the new travel route is estimated based on the location information data only. More specifically, if the density of location measurement points is low in a situation where an average travel path is generated on the basis of a plurality of polygonal travel paths generated by sequentially joining the location measurement points of each vehicle, the deviation from the shape of an actual road becomes significant (FIG. 3). However, the present embodiment estimates the shape of the new travel route by using the direction information data in addition to the location information data. Therefore, the shape of the new travel route that is estimated by the present embodiment is close to the shape of an actual road.

[3B] The server 2 estimates the shape of a new travel route by extending a partial travel route to the extension line of another partial travel route. Therefore, even when the shape of a travel route whose traveling direction changes is to be estimated, the present embodiment can estimate the shape of the travel route without significantly deviating from the shape of an actual road.

[3C] When the traveling directions indicated by direction information data are similar to each other in a situation where a plurality of off-route location information data satisfying positional conditions of being positioned close to each other are handled, the server 2 equalizes the traveling directions indicated by the direction information data and then estimates the shape of a new travel route. Therefore, the present embodiment prevents the estimation of the shape of the new travel route from being affected by variations attributable, for instance, to a traveling direction detection error of a vehicle and a traveling direction shift during a lane change.

[3D] In addition to location information data and direction information data, the server 2 also acquires speed information data that indicates a vehicle's traveling speed at a location indicated by the location information data. The server 2 then identifies a partial travel route on the basis of off-route location information data, direction information data indicative of a vehicle's traveling direction at a location indicated by the off-route location information data, and speed information data indicative of a vehicle's traveling speed at a location indicated by the off-route location information data. More specifically, the server 2 identifies a partial travel route that extends from the location indicated by the off-route location information data by a length appropriate for the traveling speed indicated by the speed information data. Therefore, the present embodiment achieves higher accuracy in estimating a new travel route than when the partial travel route is identified without regard to the traveling speed.

[3E] The server 2 sets an off-route area that includes locations indicated by off-route location information data and excludes a travel route existing in a map represented by map data. Then, on the basis of the degree of variation in direction information data at locations indicated by the off-route location information data included in the off-route area, the server 2 determines whether the off-route location information data in the off-route area indicates a travel path in at least either a parking lot or a community road (S103). Therefore, the present embodiment makes it possible to distinguish parking lots and community roads from roads (for example, expressways and local roads) used for route guidance by a navigation system.

[3F] When the density of locations indicated by off-route location information is high (S104: YES), the server 2 estimates the shape of a new travel route on the basis of location information data only (S105). Therefore, the present embodiment reduces processing load when the density of locations indicated by the off-route location information data is high.

[3G] When the density of locations indicated by off-route location information data is high (S201: YES), the server 2 uses only location information data to determine whether the off-route location information data indicates a travel route in a parking lot or a community road (S202). Therefore, the present embodiment reduces processing load when the density of locations indicated by the off-route location information data is high.

In the present embodiment, the control circuit 24 of the server 2 corresponds to an example of a travel route information generation apparatus, S101 corresponds to an example of a process performed by an acquisition section, and S103 to S107 correspond to an example of a process performed by a generation section. Further, S103 corresponds to an example of a process performed by a non-guiding route determination section, and S106 and S107 correspond to an example of a process performed by an estimation section.

[4. Alternative Embodiments]

While an embodiment of the present disclosure has been described, it should be understood that the present disclosure is not limited to the foregoing embodiment, and that modifications and variations can be made without departing from the spirit and scope of the present disclosure.

Figure 8:
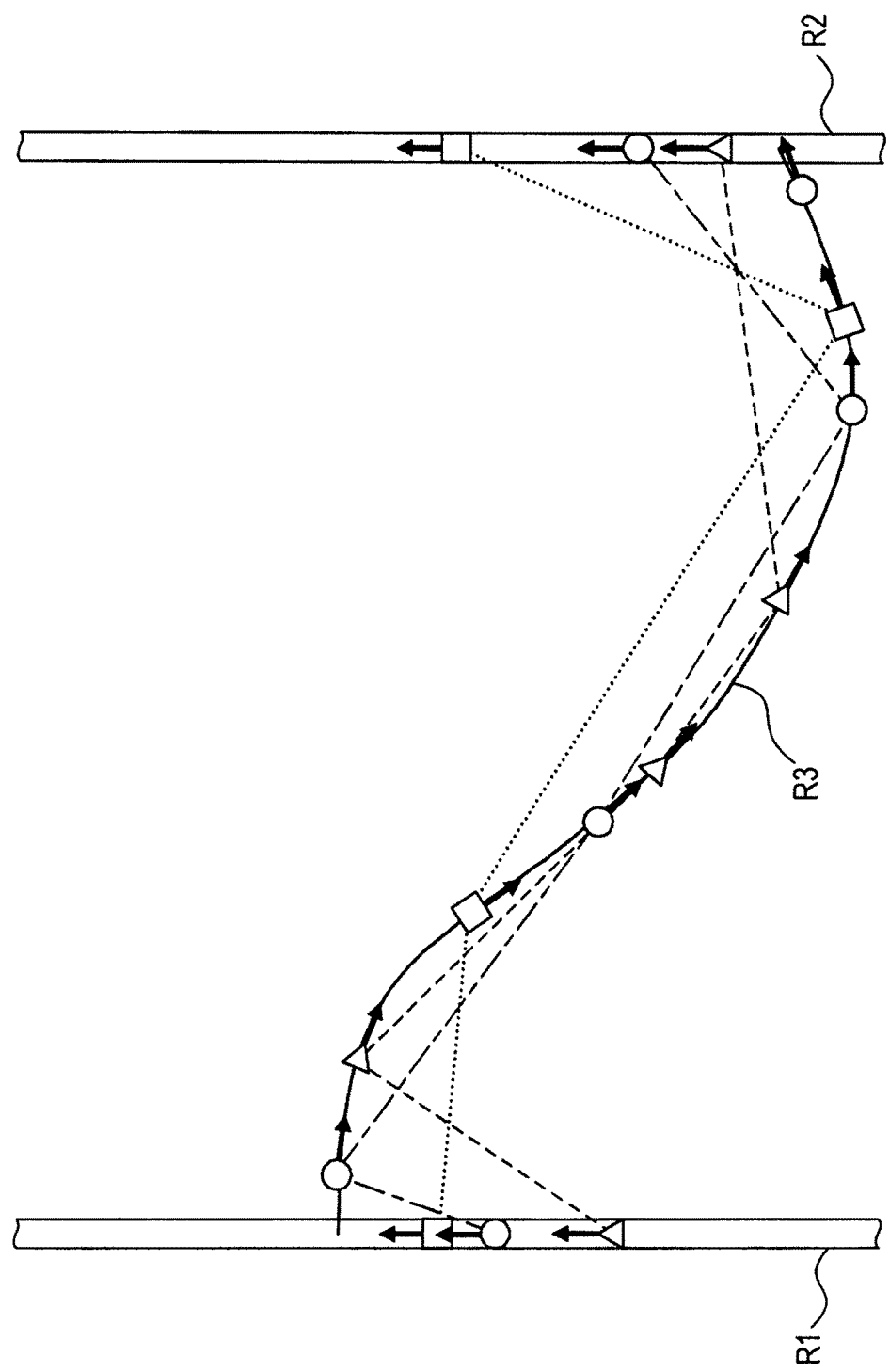
FIG. 8 is a diagram illustrating a new travel route that is estimated in the form of a curved line.

[4A] In the foregoing embodiment, the insufficiency between partial travel routes is interpolated to estimate the overall shape of a new travel route by linearly extending a partial travel route to the extension line of another partial travel route. However, the present disclosure is not limited to the use of such a method. As in FIG. 8, the overall shape of the new travel route may be estimated by making an initial estimation in the form of a polygonal line and then approximating or otherwise converting the result of initial estimation to the form of a curved line. If the new travel route is an expressway, it may be estimated in the form of a curved line. If the new travel route is a road other than an expressway, it may be estimated in a linear form (for example, in the form of a polygonal line). Whether the new travel route is an expressway may be determined based on its connection to an existing travel route (the new travel route may be determined to be an expressway if, for example, the associated travel path is a continuation from an existing expressway). Further, the shape of a curved line may be set as appropriate from the viewpoint of road engineering (set to a shape that meets various conditions imposed on a road).

[4B] The foregoing embodiment has been described on the assumption that travel routes on different hierarchical levels are distinguished from each other on the basis of altitude. However, the present disclosure is not limited to the use of such a method. The different hierarchical levels may alternatively be distinguished from each other, for example by identifying the connection to an existing travel route on the basis of a travel path.

[4C] When the density of locations indicated by off-route location information data is high, the foregoing embodiment makes a determination on the basis of location information data only (S105, S202). However, the present disclosure is not limited to the use of such a method. The determination may alternatively be made, for example, by using at least direction information data without regard to the density.

[4D] The foregoing embodiment has been described on the assumption that location information data, direction information data, and speed information data are transmitted as travel path data from the in-vehicle apparatus 1 to the server 2. However, information data indicative, for example, of the inclination of a vehicle (the gradient of a road) at a location measurement point may alternatively be transmitted from the in-vehicle apparatus 1 to the server 2. Using such information data makes it possible to determine the gradient of a road. Therefore, continuity between one existing travel route and another and hierarchical levels of travel routes can be accurately determined.

[4E] The in-vehicle apparatus 1 is not limited to a dedicated apparatus that is mounted in a vehicle and secured. Alternatively, the in-vehicle apparatus 1 may be a smartphone or other mobile apparatus.

[4F] The present disclosure may be implemented not only by the earlier-mentioned travel route information generation apparatus, but also by a program product, travel route information collection system, travel route information generation method, or other similar scheme that includes instructions for causing a computer to function as the travel route information generation apparatus and is stored on a non-transitory computer-readable storage medium.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A travel route information generation apparatus comprising:
    an acquisition section that acquires location information data, direction information data of the location information data, and speed information data of the location information data on a periodic basis,
        the location information data indicating a travel path of a vehicle using discrete locations,
        the direction information data of the location information data indicating a travel direction of the vehicle at each location indicated by the location information data,
        the speed information data of the location information data indicating a traveling speed of the vehicle at each location indicated by the location information data; and
    a generation section that generates information on a new travel route that does not exist in a map represented by map data, based on off-route location information data, the off-route location information data being the location information data indicative of a travel path deviated from a travel route existing in the map represented by the map data,
    wherein the generation section includes an estimation section that
        estimates partial travel routes indicative of parts of the new travel route, based on (i) the off-route location information data, (ii) the direction information data of the off-route, location information data indicative of the traveling direction at each location indicated by the off-route location information data, and (iii) the speed information data of the off-route, location information data indicative of the traveling weed at each location indicated by the off-route location information data,
        estimates a shape of the new travel route based on the partial travel routes,
        identifies the partial travel route that extends from each location indicated by the off-route, location information data by a length that is increased as the traveling speed indicated by the speed information data is increased, and
        if
            (i) a plurality of off-route location information data meets positional conditions of being positioned close to each other, and (ii) information data of the plurality of off-route location information data is similar to each other, the estimation section identifies a plurality of partial travel routes based on the plurality of off-route location information data meeting positional conditions of being positioned close, to each other, joins the plurality of partial travel routes to generate a single joined partial travel route, and estimates the shape of the new travel route, the single joined partial travel route being generated by equalizing the plurality of traveling directions of the plurality of off-route location information data into an equalized traveling direction.

2. The travel route information generation apparatus according to claim 1, wherein the estimation section estimates the shape of the new travel route by extending one of the partial travel routes to an extension line of a different one of the partial travel route.

3. The travel route information generation apparatus according to claim 1, wherein the generation section includes a non-guiding route determination section that sets an off-route area that includes locations indicated by the off-route location information data and excludes a travel route existing in the map represented by the map data, and determines, based on a degree of variation in the direction information data at each location indicated by the off-route location information data included in the off-route area, whether the off-route location information data in the off-route area indicates a travel path in at least either a parking lot or a community road.

4. The travel route information generation apparatus according to claim 1, wherein when generating the single joined partial travel route, the estimation section equalizes the plurality of traveling directions of the plurality of off-route location information data into the equalize traveling direction by setting an average travel direction that is an average of the plurality of traveling directions of the plurality of off-route location information data.

5. The travel route information generation apparatus according to claim 1, wherein when generating the single joined partial travel route by equalizing the plurality of traveling directions of the plurality of off-route location information data into the equalized traveling direction, the estimation section generates the singe joined partial travel route such that the signal joined partial travel route extends from a tail end among the plurality of off-route location information data in the equalized traveling direction, while having a total length that is obtained by joining lengths of the plurality of partial travel routes.

6. The travel route information generation apparatus according to claim 1, wherein the estimation section estimates the shape of the new travel route as a polygonal line based on the plurality of partial travel routes, and converts the polygonal line to a curved line to estimate an overall shape of the new travel route as a curved line.

7. The travel route information generation apparatus according to claim 1, wherein the estimation section estimates the shape of the new travel route as a polygonal line based on the plurality of partial travel routes to estimate an overall shape of the new travel route as the polygonal line.

\* \* \* \* \*